Sept. 3, 1968 A. B. HAWES 3,399,629
MONORAIL TRAIN HAVING ARTICULATED TRUCKS
Filed March 25, 1966 3 Sheets-Sheet 2

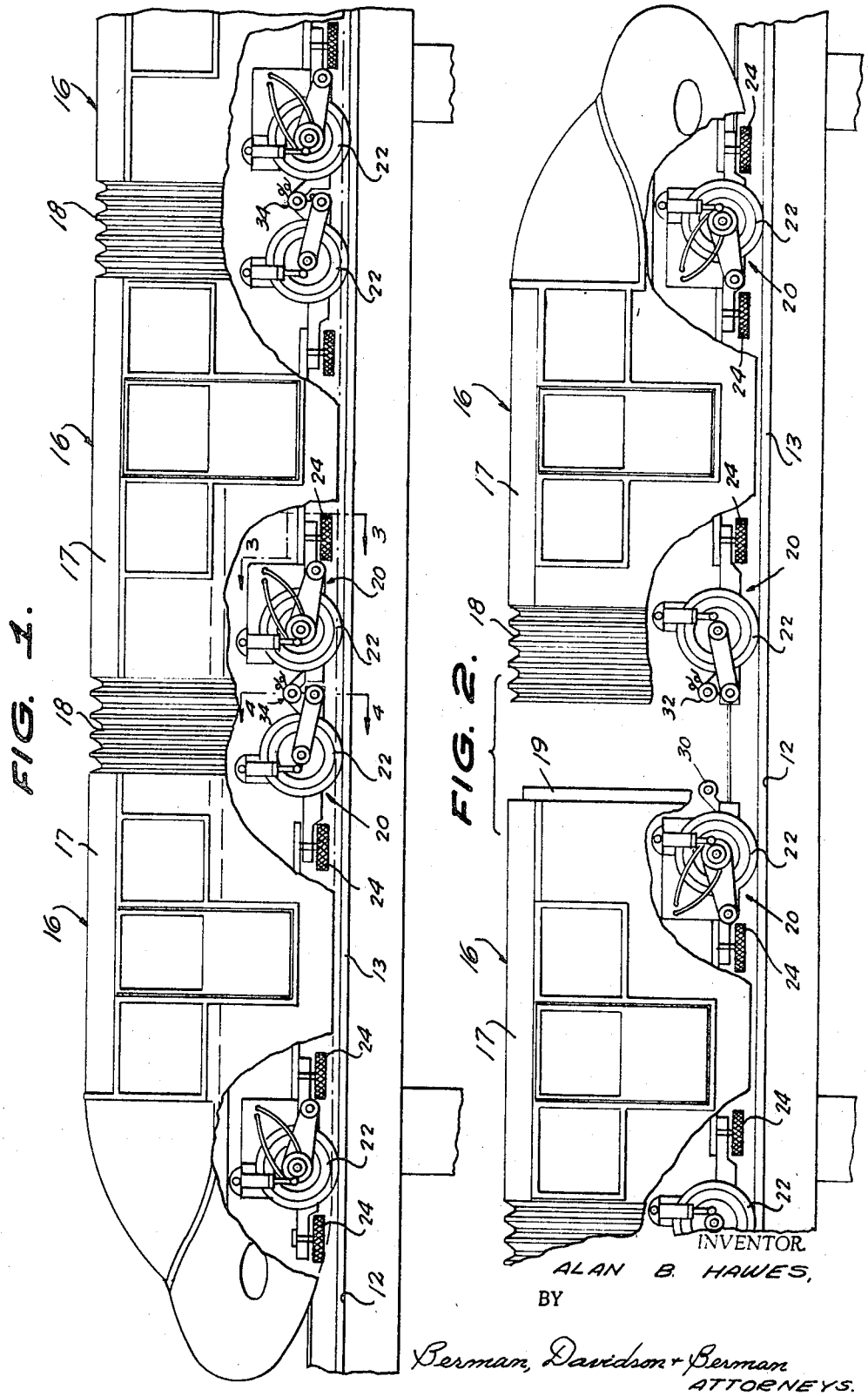

INVENTOR.
ALAN B. HAWES,
BY
Berman, Davidson & Berman
ATTORNEYS.

Sept. 3, 1968  A. B. HAWES  3,399,629
MONORAIL TRAIN HAVING ARTICULATED TRUCKS
Filed March 25, 1966  3 Sheets-Sheet 3

INVENTOR.
ALAN B. HAWES,
BY
Berman, Davidson + Berman
ATTORNEYS.

United States Patent Office 3,399,629
Patented Sept. 3, 1968

3,399,629
MONORAIL TRAIN HAVING ARTICULATED
TRUCKS
Alan B. Hawes, 8504 Seaview Ave.,
Wildwood Crest, N.J. 08260
Filed Mar. 25, 1966, Ser. No. 537,347
3 Claims. (Cl. 104—118)

ABSTRACT OF THE DISCLOSURE

A monorail train having articulated trucks and a plurality of train car sections arranged in tandem relation, the complemental end portions of adjacent car sections each carrying a truck including a pair of vertical wheels and a pair of horizontal guide wheels, the trucks of the adjacent car sections being disposed so that one end of one truck is adjacent the rear end of the forward section and the other end of the other truck is adjacent to the front end of the next behind car section, interengageable means on the facing ends of said trucks and releasable fastening means to couple the pair of trucks together, said interengaging means including an ear on one truck receivable between a pair of lugs on the other truck, and said fastening means including a solenoid means slidably supported in one of said lugs and extendible into and retractable out of the ear.

---

This invention relates to a monorail train in which the assembled train cars may be coupled together or uncoupled from each other.

An object of the present invention is to provide a monorail train in which the assembled train cars carry articulated trucks which may be coupled together or uncoupled from each other, with facility and ease.

Another object of the present invention is to provide a monorail train in which the assembled train cars carry articulated trucks which may be coupled together or uncoupled from each other at the will of the operator.

A further object of the present invention is to provide a monorail train in which the assembled train cars carry articulated trucks which are positive in action in either disconnection or connection and which are commercially feasible.

Other objects and advantages of the present invention will become apparent from the following description taken in conjunction with the accompanying drawings, in which:

FIGURE 1 is a side elevational view of a monorail train, with parts broken away, to show the articulated truck assemblies according to the present invention.

FIGURE 2 is an exploded view of the front end portion of the train of FIGURE 1, with parts broken away, to show the articulated truck assemblies according to the present invention.

Figure 3:
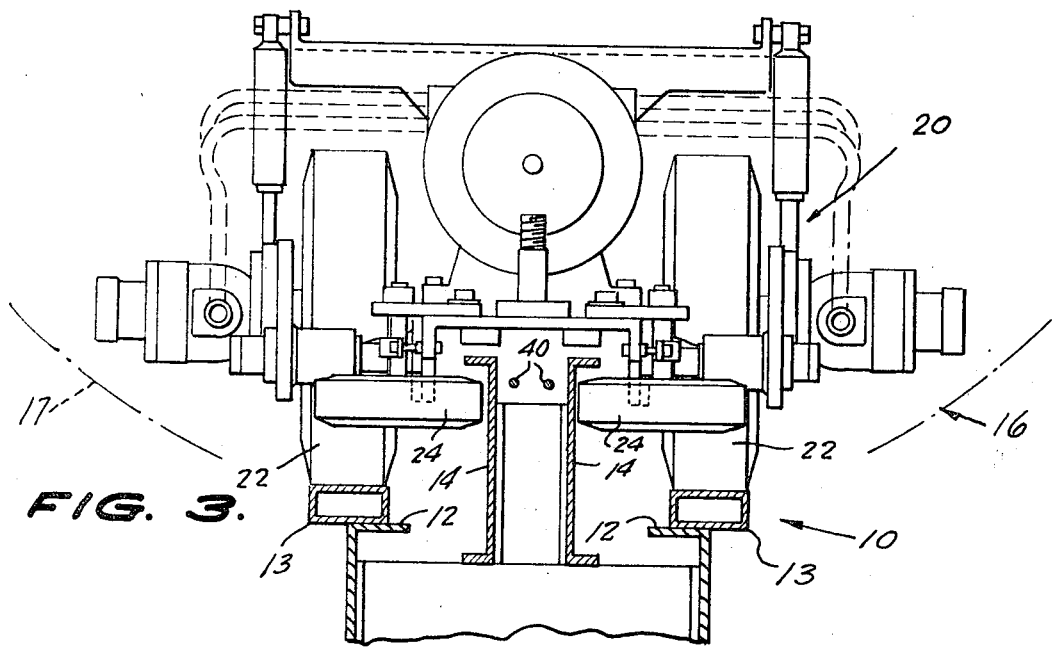
FIGURE 3 is a cross-sectional view taken on the line 3—3 of FIGURE 1.

Referring to the drawings, the numeral 10 designates, generally, an elongated monorail which has a horizontal surface 12 and opposed vertical surface 14. The surface 12 includes spaced hollow tracks 13 which are adapted for rolling engagement by laterally-spaced vertical rotatable wheels on trucks carried by train cars, and the opposed vertical surfaces are adapted for rolling engagement, at times, by laterally-spaced horizontal rotatable guide wheels which are also on the trucks carried by the train cars, as will be subsequently described.

A plurality of train cars 16, FIGURE 1, arranged in tandem relation are mounted on the monorail 10 for travel therealong. The body 17 of each of the adjacent cars 16 is connected together by a flexible connector hood 18. Specifically, each hood 18, FIGURE 2, projects longitudinally from the rear end of the body 17 of the forward train cars 16, and has its free end releasably and embracingly-engaged over a flange 19 projecting from the front end of the body 17 of the train car 16 directly behind the forward train car 16.

The complemental end portions of adjacent train cars 16 each carries a truck 20 which includes a pair of laterally-spaced vertical rotatable wheels 22 at one end which are in rolling engagement with the tracks 13 of the horizontal surface 12 and a pair of laterally-spaced horizontal rotatable guide wheels 24 at the other end which, at times, engage the vertical surfaces 14 in rolling engagement therewith. The trucks 20 of adjacent train cars 16 are disposed so that the one end of one of the trucks 20 is adjacent the rear end of the forward train car 16 with the vertical wheels 22 inwardly of and adjacent the rear end of the forward train car 16 and the horizontal guide wheels 24 remote from the rear end of the forward train car 16, and the one end of the other of the trucks 20 faces toward and is adjacent the front end of the next behind train car 16 with the vertical wheels 22 inwardly of and adjacent the front end of the next behind train car 16 and the horizontal guide wheels 24 remote from the front end of the next behind train car 16.

It is to be noted that the pair of vertical rotatable wheels 22 on the truck 20 at the front end of the train car 16 next behind the forward train car 16, FIGURES 1 and 2, are in driving rolling engagement with the tracks 13 of the horizontal surface 12, and are positively driven at the will of the operator of the monorail train while the pair of vertical rotatable wheels 22 on the truck 20 at the rear end of the forward train car 16 are merely in free rolling engagement with the tracks 13 of the horizontal surface 12.

Inneregaging means is on the facing ends of the trucks 20, said means embodying an ear 30 which is on one of the facing ends of the trucks 20 or the facing end of the truck 20 at the rear end of the forward train car 16, the ear 30 being receivable between a pair of lugs 32 on the other of the facing ends of the trucks 20 or the facing end of the truck at the front end of the train car 16 next behind the forward train car 16.

Figure 4:
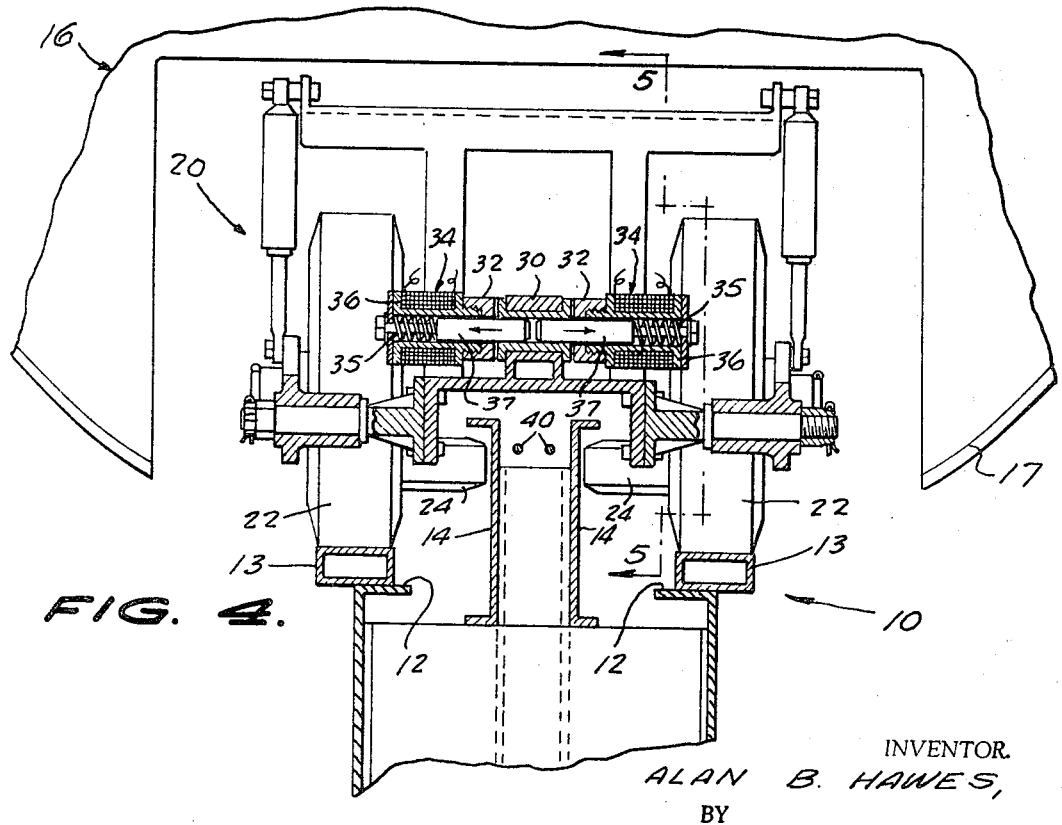
FIGURE 4 is a cross-sectional view taken on the line 4—4 of FIGURE 1.
Figure 5:
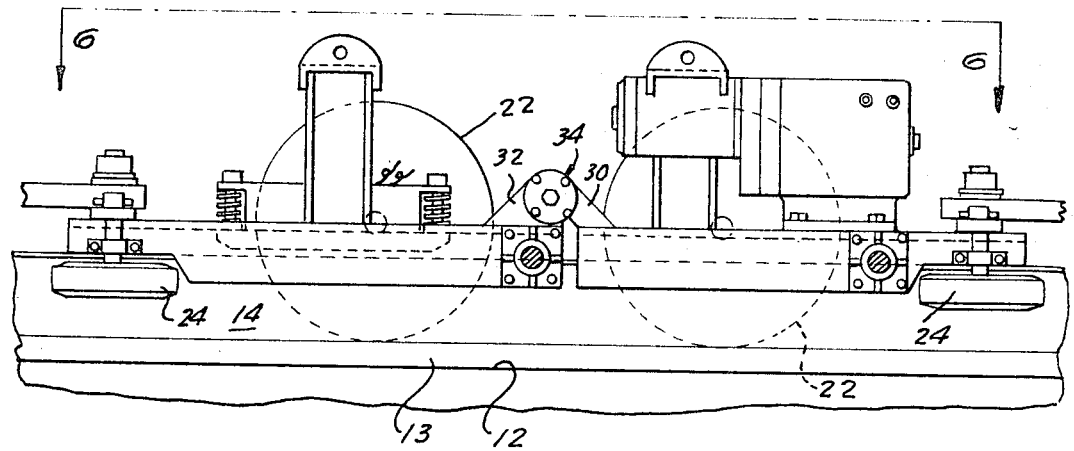
FIGURE 5 is a view taken on the line 5—5 of FIGURE 4.
Figure 6:
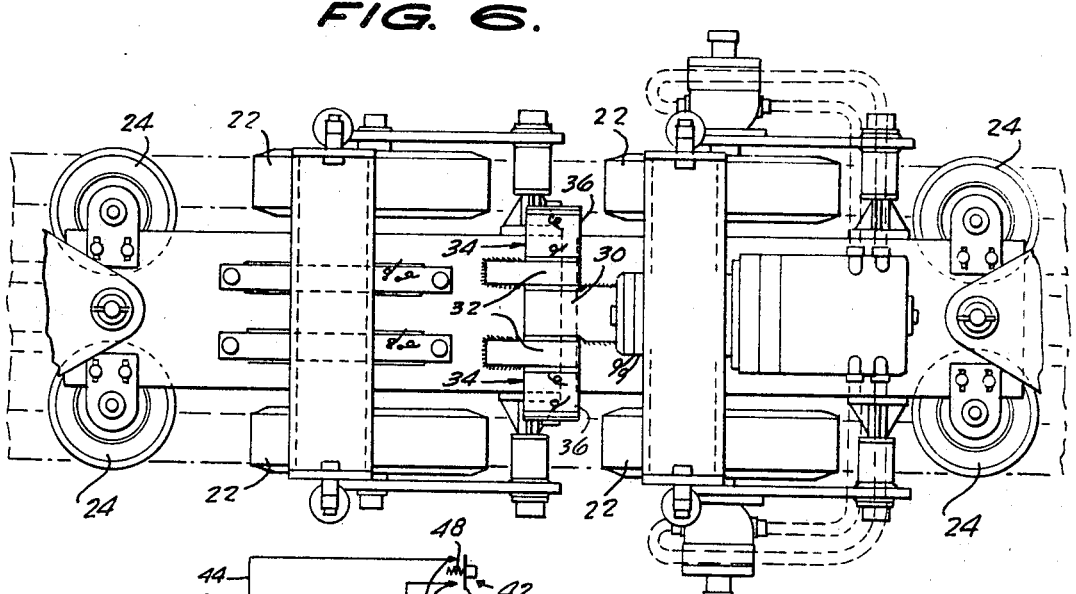
FIGURE 6 is a plan view of the assembly of FIGURE 5.

Releasable fastening means is provided which is mountable in the interengaging means on the facing ends of the trucks 20, when interengaged, to couple the pair of trucks 20 together. Specifically, the fastening means embodies a solenoid-operated plunger 34 which is slidably-supported in each one of the pair of lugs 32 and is extendible into and retractable out of the ear 30. Operatively-connected to each solenoid 34 is a spring means embodying a coil spring 35. As shown in FIGURE 4, a solenoid 36 is mounted in each of the lugs 32 and a plunger 37 is slidably-supported in the adjacent lug 32 and is extendible into and retractable out of the ear 30. The coil spring 35 is supported in the inner end portion of the adjacent solenoid 36 and has its outer end bearing against the adjacent plunger 37.

Figure 7:
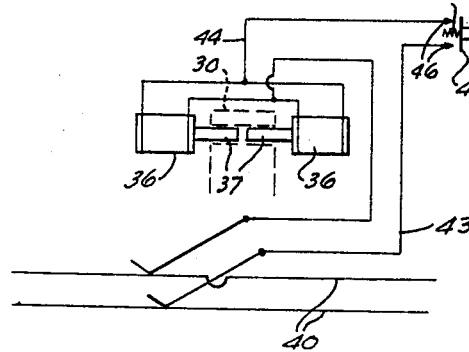
FIGURE 7 is a diagrammatic showing of the electrical components for operating the solenoid fastening means.

Referring to FIGURE 7, the numeral 40 indicates an electric current source to which is electrically-connected a switch 42 and the solenoids 36, the source being connected to the switch 42 by means of line 43 and to the solenoids 36 by means of line 44. To actuate the switch 42 the contact bar 45 is moved so as to bridge the pair of fixed contacts 46, resulting in energization of the solenoids 36 and consequent movement of the plungers 37 out of the ear 30 and into the lugs 32 against the action of the coil springs 35 to disconnect or uncouple the ears 30 from the lugs 32. Opening of the switch 42 by causing the contact bar 45 to move out of contacting engagement with the fixed contacts 46 under the action of the biasing spring 48, results in the movement of the plunger 37 into the ear 30 under the action of the coil springs 35 to connect or couple the ears 30 to the lugs 32.

In operation, with the monorail having the train cars in assembled relation as illustrated in FIGURE 1, the complemental end portions of the train cars 16 may be disconnected or uncoupled by the operator of the train, causing the actuation of the switch 42 so that the contact bar 45 is moved to bridge the pair of fixed contacts 46, resulting in the energization of the solenoids 36 and consequent movement of the plungers 37 out of the ear 30 and into the lugs 32 against the action of the coil springs 35. To connect or couple the complemental end portions of the train cars 16, FIGURE 2, the front train car 16 is backed until the free end of the hood 18 embracingly-engages the flange 19 of the train car 16 directly behind the front train car 16, and the ear 30 on the truck 20 of the behind train car 16 is received between and in alignment with the pair of ears 30 on the truck 20 of the front train car 16, whereupon the plungers 37 move into the ear 30 under the action of the springs 35 to couple the front and the next behind train cars 16 together.

I claim:

1. The combination with an elongated monorail having a horizontal surface and opposed vertical surfaces, of a plurality of train cars arranged in tandem relation and mounted on said monorail for travel therealong, the complemental end portions of adjacent train cars each carrying a truck including a pair of laterally-spaced vertical rotatable wheels at one end and in rolling engagement with said horizontal surface and a pair of laterally-spaced horizontal rotatable guide wheels at the other end located contiguous to and adapted to at times engage said vertical surfaces in rolling engagement therewith, the trucks of the adjacent train cars being disposed to that the one end of one of the trucks is adjacent the rear end of the forward train car with the vertical wheels inwardly of and adjacent the rear end of the forward train car and the horizontal guide wheels remote from the rear end of the forward train car and the one end of the other of the trucks facing toward and adjacent to the front end of the next behind train car with the vertical wheels inwardly of and adjacent the front end of the next behind train car and the horizontal guide wheels remote from the front end of the next behind train car, interengageable means on the facing one ends of said trucks, and releasable fastening means mountable in the means on the facing ends of said trucks, when interengaged, to couple the pair of trucks together, said interengaging means embodying an ear on one of the facing ends of said trucks which is receivable between a pair of lugs on the other of the facing ends of said trucks, and said fastening means embodying a solenoid means which is slidably supported in each one of the pair of lugs and is extendible into and retractable out of the ear.

2. A monorail train having articulated trucks and a plurality of train car sections arranged in tandem relation, the complemental end portions of adjacent car sections each carrying a truck including a pair of vertical wheels and a pair of horizontal guide wheels, the trucks of the adjacent car sections being so disposed as to present adjacent ends in coupling relation adjacent the rear end of the forward section and the front end of the next behind car section respectively, interengageable means on the facing ends of said trucks and releasable fastening means to couple the pair of trucks together, said interengaging means including an ear on one truck receivable between a pair of lugs on the other of said trucks, and said fastening means including a solenoid means slidably supported in one of said lugs and extendible into and retractable out of the ear.

3. The combination according to claim 1, which includes in addition spring means operatively-connected to each solenoid means and biasing the solenoid means to the extended position.

References Cited

UNITED STATES PATENTS

| 2,853,956 | 9/1958 | Wenner-Gren et al. | 104—120 |
| 2,974,606 | 3/1961 | McRander | 104—118 |
| 3,095,820 | 7/1963 | Deller | 105—144 |
| 3,092,039 | 6/1963 | Lich | 104—119 |
| 3,143,977 | 8/1964 | Deller | 105—144 |
| 3,338,182 | 8/1967 | Maestrelli | 104—247 |

ARTHUR L. LA POINT, *Primary Examiner.*

R. A. BERTSCH, *Assistant Examiner.*